Feb. 24, 1925.
R. STOCK
VEHICLE WHEEL
Original Filed June 23, 1920 2 Sheets-Sheet 1
1,527,530
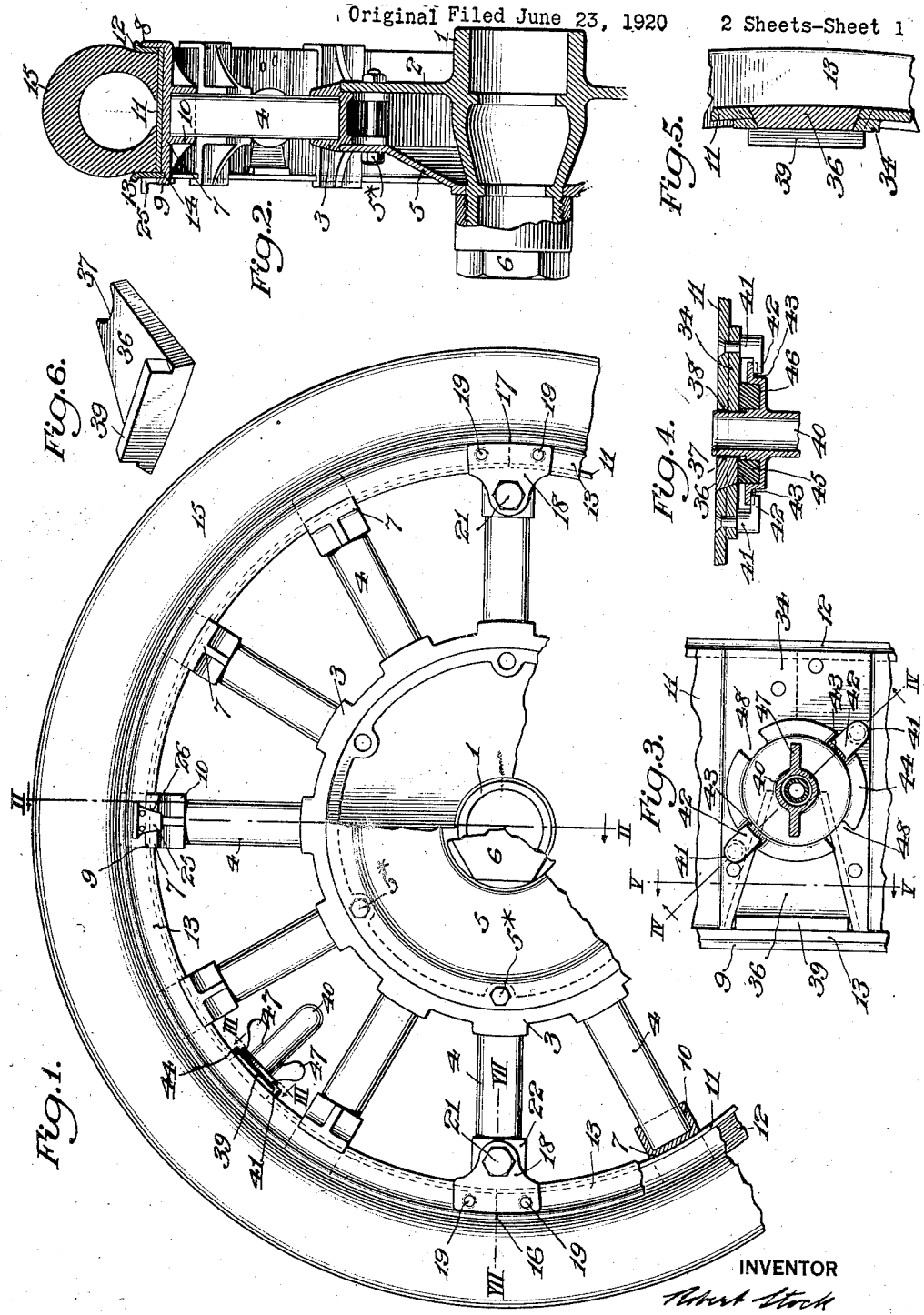
INVENTOR
Robert Stock
BY
ATTORNEYS Feb. 24, 1925.
R. STOCK
1,527,530
VEHICLE WHEEL
Original Filed June 23, 1920   2 Sheets-Sheet 2
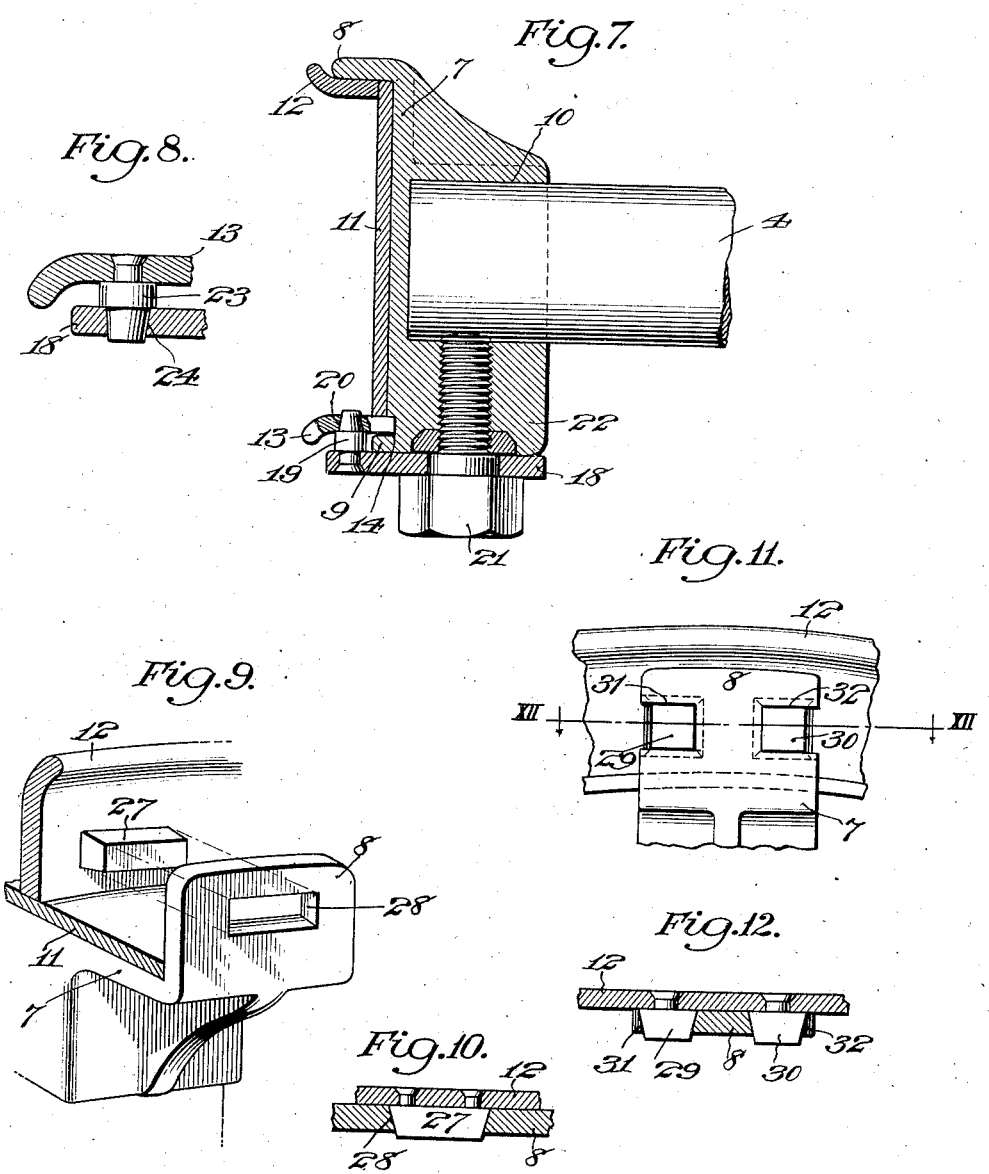

Patented Feb. 24, 1925.

1,527,530

UNITED STATES PATENT OFFICE.

ROBERT STOCK, OF CLEVELAND, OHIO.

VEHICLE WHEEL.

Application filed June 23, 1920, Serial No. 391,004. Renewed November 22, 1924.

*To all whom it may concern:*

Be it known that I, ROBERT STOCK, a citizen of the United States, and resident of the city of Cleveland, in the county of Cuyahoga and State of Ohio, have invented a new and useful Improvement in Vehicle Wheels, of which the following is a specification.

This invention relates to vehicle wheels and has for its object to provide a wheel structure which is strong, durable, simple in construction and economical in manufacturing.

Another object is to provide a wheel structure in which the spokes are provided with means for independently engaging and supporting a felly ring and its adjacent elements.

Another object is to provide a wheel structure having means carried by the spokes for supporting a felly ring, said means being provided with elements for securing in position removable side walls of the felly ring.

Another object is to provide a wheel structure having a felly ring constructed so that a tire may be removed or replaced by a horizontal movement of the same, thus obviating all prying and straining of the walls of the tire casing.

Another object is to provide certain means in the form, construction and arrangement of the several elements whereby the above named and other objects may be effectively attained.

A practical embodiment of my invention is represented in the accompanying drawings, in which—

Fig. 1 represents a side elevation of a portion of a wheel showing my improved wheel structure, certain of the parts being broken away to show the structure within.

Fig. 2 represents a vertical section taken in the plane of the line II—II of Fig. 1, looking in the direction of the arrows.

Fig. 3 represents a horizontal section, on an enlarged scale, taken in the plane of the line III—III of Fig. 1.

Fig. 4 represents a vertical section taken in the plane of the line IV—IV of Fig. 3, looking in the direction of the arrows.

Fig. 5 represents a vertical section taken in the plane of the line V—V of Fig. 3, looking in the direction of the arrows.

Fig. 6 represents a perspective view of the wedge-shaped filling piece which closes the gap in the felly ring and completes the opening in which the tire valve is located.

Fig. 7 represents a horizontal section, on an enlarged scale, taken in the plane of the line VII—VII of Fig. 1.

Fig. 8 represents a detail section on a still larger scale of a modified form of locking means for the retaining ring.

Fig. 9 represents in perspective a portion of a spoke and felly connector, showing a means for locking the retaining ring in position on the felly.

Fig. 10 represents a horizontal section taken through the locking means of the retaining ring and spoke felly connector.

Fig. 11 represents in side elevation another form of locking means for the felly ring and spoke and felly connector, and Fig. 12 represents a horizontal section taken in the plane of the line XII—XII of Fig. 11, looking in the direction of the arrows.

The hub of the wheel, denoted by 1, is provided with an annular flange 2 to which is secured a series of radially arranged sockets 3 located in position to receive spokes 4. A disk 5 is arranged on the hub 1 in position to also support the sockets 3 and held in position by means of the hub cap 6. The flange 2, disk 5 and the sockets 3 are secured together by means of bolts 5*.

The outer end of each spoke is provided with a member 7, which has outwardly extending flanges 8, 9, and an inwardly extending socket 10 adapted to receive the spoke.

A felly band 11 is arranged to be seated in the recesses formed by the outwardly extending flanges 8, 9.

A side wall 12, in the form of an annular band, is arranged in position on the felly band adjacent the outwardly extending flanges 8. A side wall 13, similar to the side wall 12, is arranged to seat in grooves 14 in the member 7 adjacent the flanges 9 and assists in holding the felly band against the flanges 8. Thus it will be seen that the felly band with its side walls 12, 13 will form a rim for the tire 15. The side wall 13 is formed of two segments the ends of which abut at 16, 17, and are held in position by means of plates 18 each of which is provided with pins 19, which are arranged to seat in holes 20 in the ends of the side wall segments 13.

The plates 18 are secured to the member 7 by means of a bolt 21 which has a threaded engagement with a boss 22 on the side of the sockets 10, as shown in Figs. 1 and 7. In Fig. 8, I have shown a modified form of the means for fastening the adjacent ends of the segments, in which form the pins 23 are secured to the side wall segments 12 and arranged to enter holes 24 in the plates 18. To provide a means for centering the side wall segments 13, a tapered lug 25 is secured to the segments in position to engage a tapered socket 26 in one of the members 7, as shown in Fig. 1.

The side wall 12 may also be formed in segments and secured to the flanges 8 by means of lugs 27 carried by the side wall 12 and arranged to enter slots 28 in the flanges 8, as shown in Figs. 9 and 10.

In Figs. 11 and 12, I have shown a modified form of fastening means for the side wall 12, which means comprises a pair of lugs 29, 30 arranged to enter recesses 31, 32 in the flanges 8.

The felly band 11, before being installed in position in the recesses of the member 7, is split and expanded to pass over the flanges 9 and when in position the ends are brought together and connected by a plate 34 which is riveted or welded to the free ends of the felly band. At the point where the band is split, I provide a means for the admission and removal of the valve stem of the tire (not shown), which means is obtained by cutting away the plate and felly band to form a dove-tailed tapered slot 35 which is closed by a tapered wedge 36.

The hole for receiving the valve stem is made by cutting away a portion 37 of the wedge to form half of the hole, and cutting away a portion 38 of the felly band and plate to form the other half of the hole. The wedge 36 is held in place by the segmental side walls 13 and to facilitate the ready removal of the wedge, it is provided with an inwardly projecting rib 39 arranged along its outer edge in position to be manipulated by any convenient tool. Thus it will be seen that by removing the segmental side walls and the wedge 36, the tire may be readily removed from the felly band by a horizontal movement, thereby obviating any strain on the valve stem or distortion of the tire.

A dust cap 40 for the valve stem is arranged to coact with the plate 34 and felly band 11 by means of oppositely disposed studs 41 carried by the plate and felly band and having offset heads 42 which rest in recesses 43 in the flange 44 of the cap and prevent the cap from unintentional displacement. A resilient washer 45 is seated in an annular recess 46 in the cap and serves to hold the heads 42 of the studs 41 in the recesses 43 of the flange 44 by its engagement with the plate 34 and wedge 36. The dust cap may be removed by compressing the resilient washer 45 and rotating the cap 40, a distance of 90°, by means of the wings 47 on the cap, so as to bring the slots 48 in register with the offset heads 42 of the studs 41.

It is obvious that various changes may be resorted to in the form, construction and arrangement of the several elements without departing from the spirit and scope of my invention; hence I do not intend to be limited to the structure herein shown and described, except as set forth in the appended claims.

What I claim is:

1. The combination with a vehicle wheel having a hub and spokes, of a felly band, felly band retaining members, each of said members being provided with a socket for the reception of the end of a spoke and a groove, and segmental side walls located in said groove to assist in holding the felly band in position on the members.

2. The combination with a vehicle wheel having a hub and spokes, of a felly band, felly band retaining members, each of said members being provided with a socket for the reception of the end of a spoke and a groove, segmental side walls located in said groove to assist in holding the felly band in position on the members, and means engaging the abutting ends of said segmental side walls for securing them in position.

3. The combination with a vehicle wheel having a hub and spokes, of a felly band, felly band retaining members, each of said members being provided with a socket for the reception of the end of a spoke and an outwardly extending flange, an annular side wall arranged in position on said felly band, and means coacting with said side wall and flange for locking them together.

4. The combination with a vehicle wheel having a hub and spokes, of a felly band, felly band retaining members, each of said members being provided with a socket for the reception of the end of a spoke, an outwardly extending flange and a groove, an annular side wall arranged in position on said felly band, means coacting with said side wall and flange for locking them together, and segmental side walls located in said grooves to assist in holding the felly band in position on the members.

5. The combination with a vehicle wheel having a hub and spokes, of a felly band, felly band retaining members, each of said members being provided with a socket for the reception of the end of a spoke, an outwardly extending flange and a groove, an annular side wall arranged in position on said felly band, means coacting with said side wall and flange for locking them together, segmental side walls located in said grooves to assist in holding the felly band in position on the members, and means engaging the abutting ends of the segments for securing them in position.

6. The combination of a vehicle wheel having a hub and spokes, of a felly band, segmental side walls arranged to coact with said felly band to form a tire rim, means interposed between each of said spokes and the felly band for supporting the felly band and side walls, and means on the side walls adapted to engage the aforesaid means for centering the segments, said means comprising a lug and socket.

In testimony, that I claim the foregoing as my invention, I have signed my name, this 18th day of June 1920.

ROBERT STOCK.